(12) United States Patent
Vadhri et al.

(10) Patent No.: US 9,734,489 B2
(45) Date of Patent: Aug. 15, 2017

(54) TRANSACTION SPLIT FEES

(71) Applicant: PAYPAL, INC., San Jose, CA (US)

(72) Inventors: Srinivas Vadhri, San Ramon, CA (US); Jennifer Ceran, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/819,330

(22) Filed: Aug. 5, 2015

(65) Prior Publication Data

US 2015/0339636 A1 Nov. 26, 2015

Related U.S. Application Data

(63) Continuation of application No. 13/934,860, filed on Jul. 3, 2013, now abandoned, which is a continuation of application No. 12/886,959, filed on Sep. 21, 2010, now Pat. No. 8,504,433.

(51) Int. Cl.

| | |
|---|---|
| *G06Q 30/00* | (2012.01) |
| *G06Q 20/00* | (2012.01) |
| *G06Q 20/24* | (2012.01) |
| *G06Q 20/26* | (2012.01) |
| *G06Q 10/00* | (2012.01) |
| *G06Q 20/10* | (2012.01) |
| *G06Q 30/06* | (2012.01) |
| *G06Q 40/00* | (2012.01) |

(52) U.S. Cl.
CPC ............ *G06Q 20/00* (2013.01); *G06Q 10/00* (2013.01); *G06Q 20/10* (2013.01); *G06Q 20/102* (2013.01); *G06Q 20/24* (2013.01); *G06Q 20/26* (2013.01); *G06Q 30/0613* (2013.01); *G06Q 30/0641* (2013.01); *G06Q 40/00* (2013.01)

(58) Field of Classification Search
CPC .................................................... G06Q 30/0613
USPC .............................................. 705/26, 27, 39
See application file for complete search history.

(56) References Cited

U.S. PATENT DOCUMENTS

| | | | |
|---|---|---|---|
| 7,104,440 B2 * | 9/2006 | Hansen | G06Q 20/00 235/379 |
| 2001/0032194 A1 | 10/2001 | Kutsuzawa et al. | |
| 2002/0156676 A1 | 10/2002 | Ahrens et al. | |
| 2003/0024979 A1 * | 2/2003 | Hansen | G06Q 20/00 235/379 |
| 2005/0165671 A1 | 7/2005 | Meade et al. | |
| 2007/0255653 A1 * | 11/2007 | Tumminaro | G06Q 20/10 705/39 |
| 2010/0250379 A1 | 9/2010 | Giordano et al. | |
| 2011/0071922 A1 | 3/2011 | Hirson et al. | |
| 2012/0245993 A1 | 9/2012 | Mesaros | |

OTHER PUBLICATIONS

"GreenZap Introduces New 'Buy Now' Buttons, Enabling Merchants to Accept Payments at No Cost", GreenZap, Inc., Aug. 4, 2006, 2 pages, Business Wire, San Francisco, California.

* cited by examiner

*Primary Examiner* — Rob Pond
(74) *Attorney, Agent, or Firm* — Haynes and Boone, LLP

(57) ABSTRACT

A transaction fee imposed by a payment provider may be allocated between the parties to an on-line transaction in any way and at any time. This adds flexibility to the transaction and allows the parties to allocate the transaction fee on a per transaction basis that best suits the parties.

18 Claims, 5 Drawing Sheets

TRANSACTION SPLIT FEES

CROSS-REFERENCE TO RELATED APPLICATIONS

This application is a continuation application of U.S. patent application Ser. No. 13/934,860, filed on Jul. 3, 2013 and U.S. patent application Ser. No. 12/886,959, filed on Sep. 21, 2010, which are hereby incorporated by reference in their entirety.

BACKGROUND

Field of the Invention

The present invention generally relates to on-line payments and more particularly to on-line payment fees.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Purchasing through the Internet from the convenience of a consumer's home, office, or virtually anywhere (with mobile devices) is one main reason why on-line purchases are growing faster and faster.

However, one disadvantage with on-line transactions, as opposed to physical point of sale (POS) transactions, is the assurance of payment by the seller and receipt of the purchased item by the buyer. Payment providers, like PayPal, Inc. of San Jose, Calif., can process a payment for an on-line transaction. Such payment providers can make transactions easier and safer for the parties. For this service, though, payment providers typically charge a fee for the seller and/or the buyer.

These fees are generally fixed by the payment provider prior to engaging in the transaction. In most situations, the fee is imposed on the seller. As a result, the seller sometimes lists or offers items for slightly more to cover that additional fee or the seller may add additional costs for the purchase, such as a shipping and handling charge. Such buyers may not be aware of the additional charge imposed by the payment provider, which benefits both the seller and the buyer. As a result, potential buyers viewing the listings may pass on a purchase because they believe the seller has too high a shipping and handling cost or the item is priced too high.

SUMMARY

In accordance with an embodiment of the invention, a transaction fee imposed by a payment provider may be allocated between the parties in any way and at any time. This adds flexibility to the transaction and allows the parties to allocate the transaction fee on a per transaction basis that best suits the parties. The transaction fee can also include shipping and handling fees or any other fees added to the payment provider fee.

In one embodiment, the transaction fee varies with the funding source of the buyer or sender. For example, a bank account may have a lower transaction fee than a credit card. In this embodiment, when a buyer decides or selects a funding source, the payment provider presents the transaction fee to the parties. The parties then decide between themselves how that fee is to be split. Once agreed upon, the split is conveyed to the payment provider, who then processes the payment according to the split.

The transaction fee may be known by both parties, such as the payment provider conveying the transaction fee or the seller informing the buyer of the fee. The parties may agree to a fee split any time prior to completing the transaction. In other embodiments, the transaction may first be completed, and the parties then decide how to split the fee. If an agreement cannot be reached, the transaction may be canceled by either party. If more than two parties are involved, the transaction fee may be split between all the parties. The payment provider then processes the payment accordingly.

As a result, buyers are more informed of fees associated with a transaction with the payment provider, the seller can shift a portion of the fees to the buyer, and the parties have more transparency to total costs of the transaction. This can result in a higher likelihood that a transaction can be completed.

These and other features and advantages of the present invention will be more readily apparent from the detailed description of the embodiments set forth below taken in conjunction with the accompanying drawings.

Figure 1:
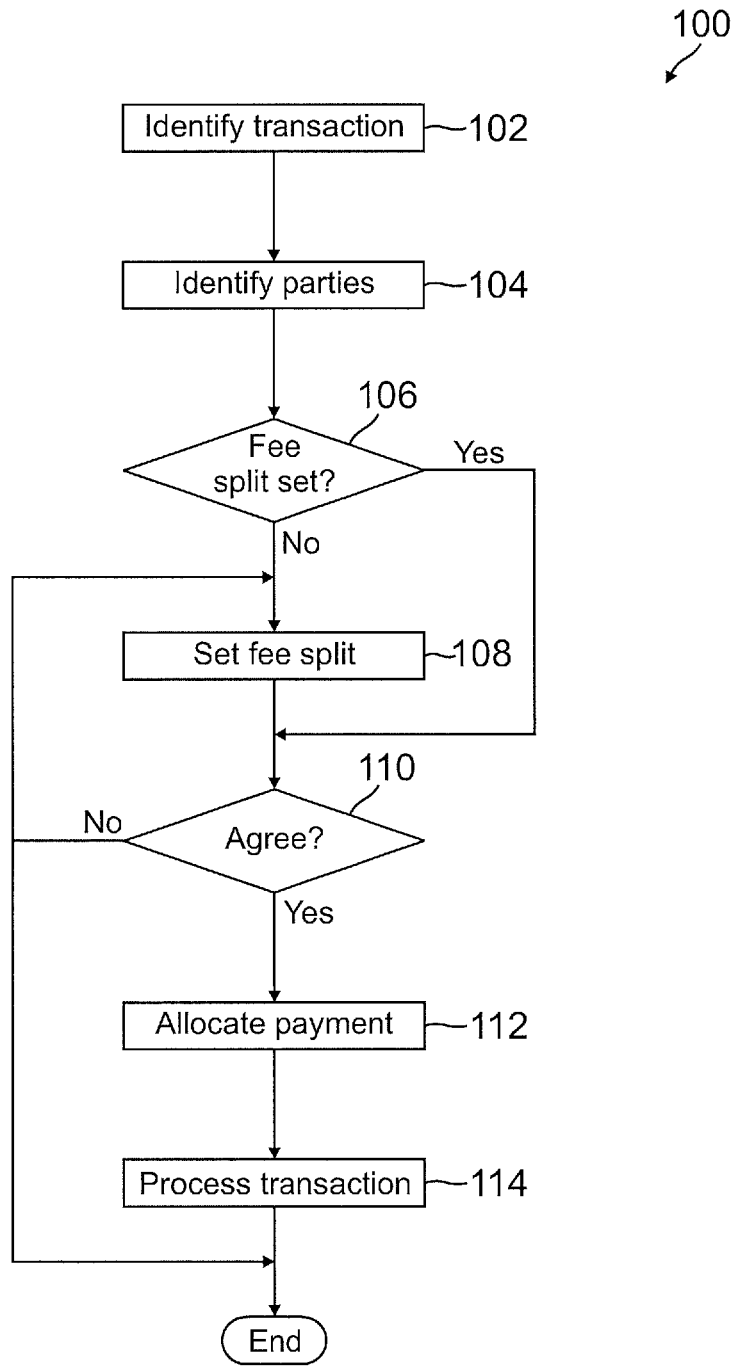
FIG. 1 is a flowchart showing a process for making a payment by splitting transaction fees according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for making a payment by splitting transaction fees according to one embodiment of the present disclosure. At step 102, a transaction between at least two parties is identified. In a typical transaction, a buyer locates a desired item on a merchant or seller site. This can be done through any device with an Internet browser, such as a smart phone, PDA, PC, etc. Thus, an item can be located by browsing the Internet, finding an appropriate merchant or retailer site, and selecting the item for purchase. The purchase may also be through an auction site or classified site. In addition to physical goods, the transaction may be for an application or digital good from an on-line store. Such items are simply downloaded onto a consumer or recipient device, as opposed to a physical good that is received at a physical location. Examples of digital goods include an image, such as to send to someone else on a networking site or for personal use, such as for an avatar. Applications may include applications available through a store such as iTunes for the iPhone by Apple. Items are used broadly to include anything that a user can purchase or make a payment for on-line. This includes donations or other charitable contributions. In one example, which will be used throughout the discussion for FIG. 1, the identified transaction is an on-line purchase of an item by a buyer from a seller. Note that this example is for illustration only and in no ways limiting.

Once the transaction has been identified, the parties to the transaction are identified at step 104. Note that identifying the parties can be before or during step 102 in different embodiments. The parties may include more than just a buyer and seller or recipient. There may be developers, "middle men," distributors, etc. that are part of the transaction. In the current example, the parties are the buyer, who may be a typical consumer, and the seller, who may be an on-line retailer.

Next, at step 106, a determination is made whether a fee split has been set. A fee split may be defined as how a transaction fee is allocated between the parties. For example, a payment provider, such as PayPal, Inc. of San Jose, Calif., may charge a fee for handling the payment, the seller or a shipper may charge a fee for shipping and/or handling, a middle man may charge a fee for putting together the transaction, etc. Thus, a transaction fee may be any fee associated with a transaction, but is typically a payment provider service charge, along with possibly shipping and handling charges imposed by the seller. The transaction fee can be a combination of fees or separated into two or more distinct and separate fees. For purposes of discussion, the transaction fee discussed in the examples is just the payment provider fee. A payment provider fee is typically charged to the seller, but can be charged to the buyer.

A transaction fee may be charged by a service provider acting as a middle-man to facilitate a transaction between a buyer and a seller. The service provider may provide the forum (such as a web site) for sellers to list items and for buyers to find and purchase items. The service provider may impose a fee on either the seller or the buyer when a purchase is made. The amount of a transaction fee may depend on many different factors, including, but not limited to, type of seller (e.g., individual or business), number of transactions, dollar amount of transaction, funding source for buyer, etc.

Typically, for a payment provider fee, the transaction fee is set and paid by the seller. However, in embodiments of the present invention, the transaction fee is split between one or more parties to the transaction. For example, a fee of $1.00 may be set, with $0.60 to be paid by the seller and $0.40 to be paid by the buyer upon completion of the transaction. The fee split may be initially determined by the seller or by the payment provider. If no fee split has been set, as determined at step 106, a fee split is set at step 108. The fee split may be determined by the seller, buyer, or the payment provider and may be based on the transactions and/or the parties identified at steps 102 and 104, respectively.

For example, the seller may set a lower split amount for the buyer if the buyer is a regular purchaser of the seller's items. A high priced purchase may result in the seller setting a lower fee split for the buyer as well, since the transaction fee will be a relatively minor part of the total purchase price and the seller is more concerned with completing the transaction than saving a few cents or dollars on the transaction fee. In other examples, the buyer may set the fee split as part of an offer for the seller's goods. The fee split may again depend on similar factors as when the seller sets the fee split. The payment provider may also set the fee split, with the split depending on any number of factors including data about the seller, data about the buyer, the amount of the transaction, etc.

Once the fee split is set, a determination is made at step 110 whether there is an agreement between the parties for the fee split. For example, if the split was set at $0.40 for the buyer and $0.60 for the seller, the parties may agree by electing to confirm the split or the transaction. Agreement may also be through other means, such as email or text. If an agreement is reached, the payment is determined or allocated at step 112. Continuing with the above example, if the total purchase price (including any fees other than the transaction fee) is $60.00, the buyer would be obligated to pay an additional $0.40 for a total payment of $60.40, with $60 going to the seller and $0.40 going to the payment provider. The seller would be responsible for paying the additional $0.60 to the payment provider for the total transaction fee of $1.00.

After the payment amount(s) have been determined, the transaction is processed at step 114. The payment provider may credit the seller's account the appropriate amount. In one example, the seller's account is credited $59.40, which is the purchase price of $60 minus the seller's portion of the transaction fee. The payment provider may also debit the buyer's account, e.g., $60.40, which is the purchase amount plus the buyer's portion of the transaction fee. The seller and/or buyer can be notified by the payment provider of a completed transaction.

Referring back to step 110, if there is no agreement on the fee split, two possibilities may occur. In one possibility, one or more parties propose a new fee split at step 108 in an attempt to reach an agreement. This may then result in an agreed upon fee split, and the transaction continues as discussed previously. In another possibility, no agreement can be reached between the parties, resulting in the transaction being canceled.

A fee split feature, as discussed herein, provides numerous advantages. For example, transaction fees can be variable and depend on different factors, such as funding source (i.e., credit card, bank account, etc.). This provides flexibility and may give the parties the best rate based on the funding source. As a result, the parties may save money and the payment provider may receive a fee most suited for its business. Furthermore, the fee split can be set at any time, again giving more flexibility for the parties. The fee may be set when an item is listed, such as at an auction, or the fee may be set after a transaction is initiated, such as during a checkout process. The fee split may be set as a dollar amount, a percentage of the purchase price, or some other means. Since the parties know the amount of any transaction fees prior to concluding a transaction, there are not surprises or cause for complaints later.

While the above has focused on a two-party transaction (seller and buyer), there may be more than two parties to a transaction, as mentioned earlier. Fees may be split between all parties or just selected ones. There may also be different fees at different stages of the transaction, so that fees may be split at any or all of these stages. The payment provider can then easily allocate the various fee splits to the appropriate parties and process the payments.

Figure 2:
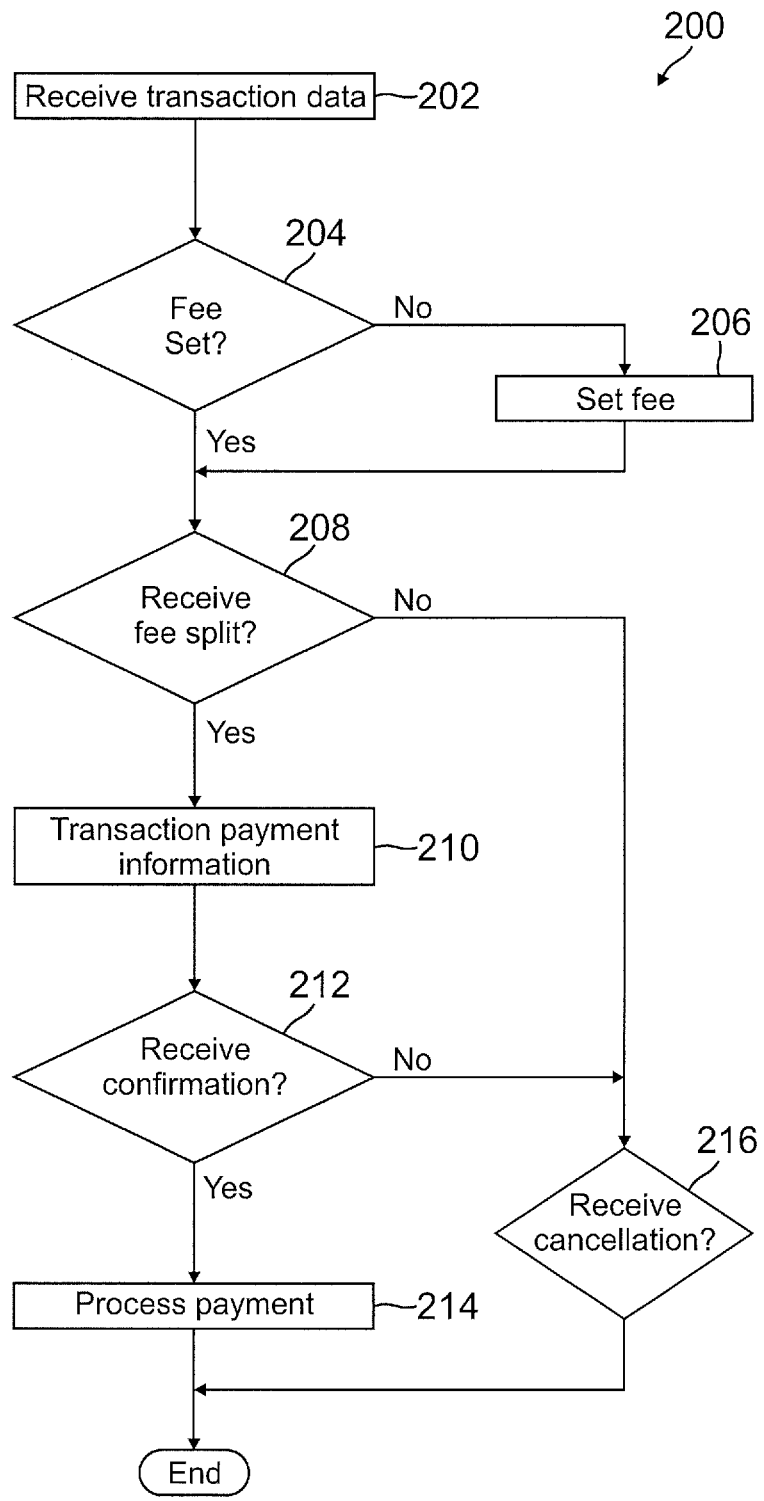
FIG. 2 is a flowchart showing a process performed by a payment provider for processing a transaction with split fees according to one embodiment.

FIG. 2 is a flowchart 200 showing steps performed by a payment provider to process a payment where transaction fees are split, according to one embodiment. At step 202, the payment provider receives transaction data, such as one or more parties selecting a button or link from an on-line to transmit information to the payment provider. Information may include, in various embodiments, details of the purchase including price, the parties to the transaction including ID, name, and type, a funding source of the buyer, and account information.

After receiving the transaction data, the payment provider determines, at step 204, whether a transaction fee has been set, which may be included in the transaction data. The transaction fee may have been preset and listed as part of the offering. However, in other embodiments, the transaction fee may not have been preset. For example, the transaction fee may be dependent on funding source or other transactional data. In that case, the payment provider sets the transaction fee, at step 206, based on the information received at step 202.

Once the fee is known, either preset or set based on transaction data, a determination is made at step 208 whether a split for the transaction fee has been received. This indicates that the parties have agreed to some splitting of the transaction fee. Note that the split could be a 100/0 split, such that one party is solely responsible for the transaction fee, while the other party has no responsibility for the fee. The payment provider may receive a proposed fee split made by one party after the transaction fee is known but before the parties have reached an agreement as to the split.

If a fee split has been received, the payment provider uses the data to transmit payment information to one or more parties at step 210. The fee split data may include a percentage or dollar amount of the amount to be split between each party to the transaction. The payment provider then adjusts the payment amounts based on the transaction fee and split amount. At this point, the parties have the final payment amounts and details of the transaction so that the transaction can be confirmed if desired. This determination is made at step 212. A received confirmation may include the buyer selecting or clicking on a "Pay," "Confirm," or other similar button or link. This causes the information to be transmitted to and received by the payment provider.

Once confirmation is received, the payment provider processes the payment at step 214. Using the information received, the payment provider is able to determine how much to credit to or debit from each party's account. Thus, the received information typically includes account information of the parties, identifying information of the parties, contact information of the parties, and details of the purchase. Processing may also include transmitting a confirmation of a completed transaction to one or more of the parties.

Referring back to step 208, if no fee split was received, which may indicate that the parties have not agreed to a fee split or that no fee split has been set or proposed, a determination is made at step 216 whether a cancellation was received. If the parties could not agree to a fee split, one of the parties may have canceled the transaction, such as clicking on a "Cancel" button or link. A cancellation may also be conveyed by other means, as is known by those skilled in the art. If a cancellation is received or detected, the transaction is canceled.

The transaction may also be canceled even after the parties have agreed on a fee split. Referring to step 212, one of the parties may cancel or not confirm the transaction at a later stage of the processing, such as during a checkout or final payment portion. In that case, the buyer may decide to cancel the transaction, such as selecting a "cancel" or similar button or link, or simply closing the window or powering off the device without confirming the transaction.

Figure 3:
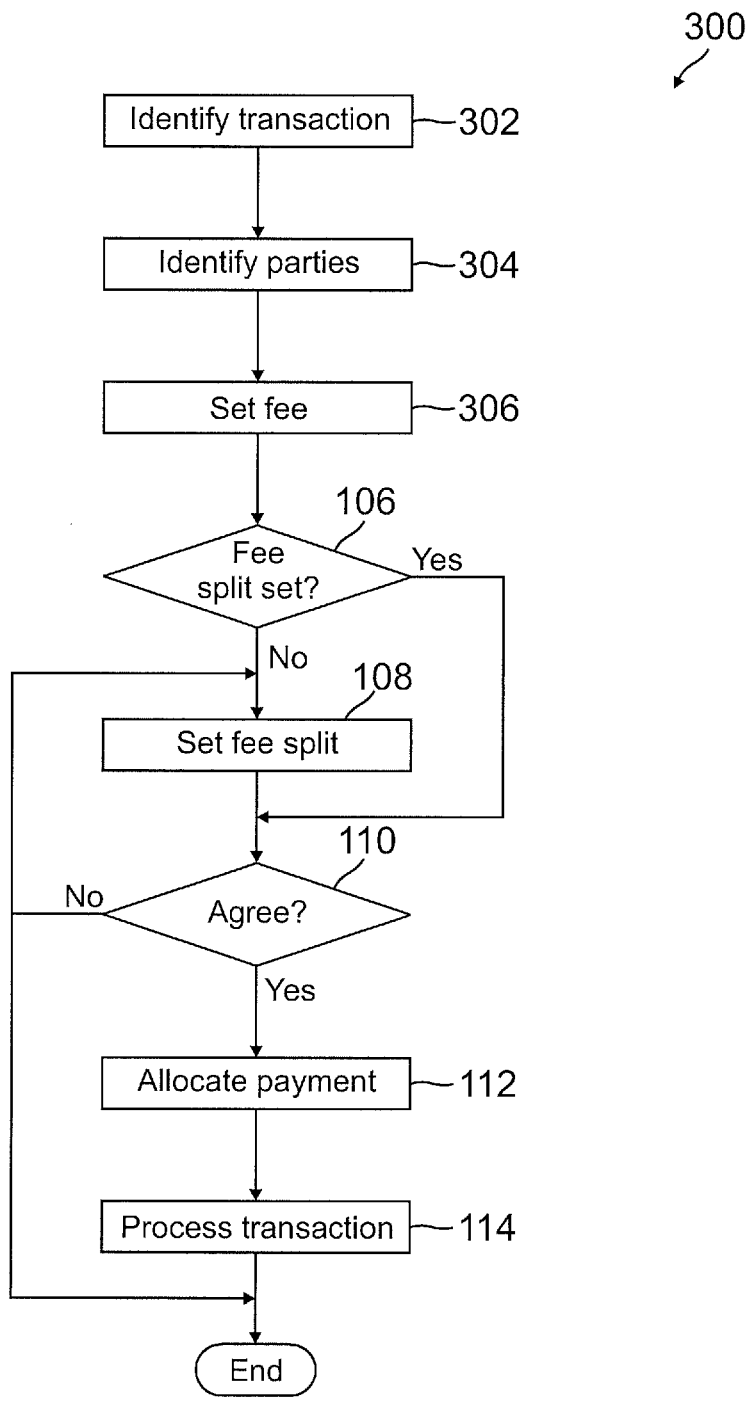
FIG. 3 is a flowchart showing a process for making a split fee transaction according to another embodiment.

FIG. 3 is a flowchart 300 showing a process for making an on-line transaction with fee splitting according to another embodiment of the present invention. At step 302, the transaction is identified, which may include identification of the items to be purchased, cost of the items, costs imposed by the seller, and any other costs associated with the transaction outside transaction fees. Next, the parties are identified at step 304. Note that steps 302 and 304 may occur together instead of separately and can be in different order.

Identification of the parties may include the identity of one or more of the parties involved in the transaction, account information of the parties, funding source of the buyer, location of the parties, and any other relevant information about the parties needed or desired by the payment provider. This information, in conjunction with the transaction information, will help the payment provider determine a transaction fee at step 306.

The amount of the transaction fee may be based on any number of factors and may vary between transactions, parties, and payment providers. For example, the transaction fee may be lower for a lower cost transaction, a valued seller, buyer, and/or other party to the transaction, a high volume seller, less complicated transactions, transactions between parties in the same country or using the same currency, and/or a "lower" risk transaction. A lower risk transaction may be one in which the payment provider has a higher confidence level that the parties will not dispute the transaction later. A lower transaction fee may also be given when certain buyer funding sources are used, such as a debit card or bank account as opposed to a credit card. Higher transaction fees may be imposed on higher dollar amount transactions, less valued sellers and/or buyers, riskier transactions, more difficult transactions, and/or a buyer funding source that makes the funding more difficult or costly.

Once the fee is set, the fee is conveyed to the parties, where a fee split is determined. At step 106, a determination is made whether the fee split has been set, such as described above with respect to FIG. 1. The remaining steps are similar to those in FIG. 1 and will not be repeated in detail. If the fee split has not been determined, the fee split is set at step 108. A determination is then made at step 110 whether there is an agreement between the parties to the fee split. If not, the parties attempt to reach an agreement, such as by modifying the fee split if needed. If no agreement is reached, the transaction may be canceled.

If the parties agree to the fee split, the payment is allocated at step 112, which includes at least the buyer's portion of the transaction fee. If the transaction is confirmed, the payment provider processes the transaction at 114 by debiting the appropriate amount from the buyer's account and crediting the appropriate amount to the seller's account, where the amount may be different between the two accounts.

Figure 4:
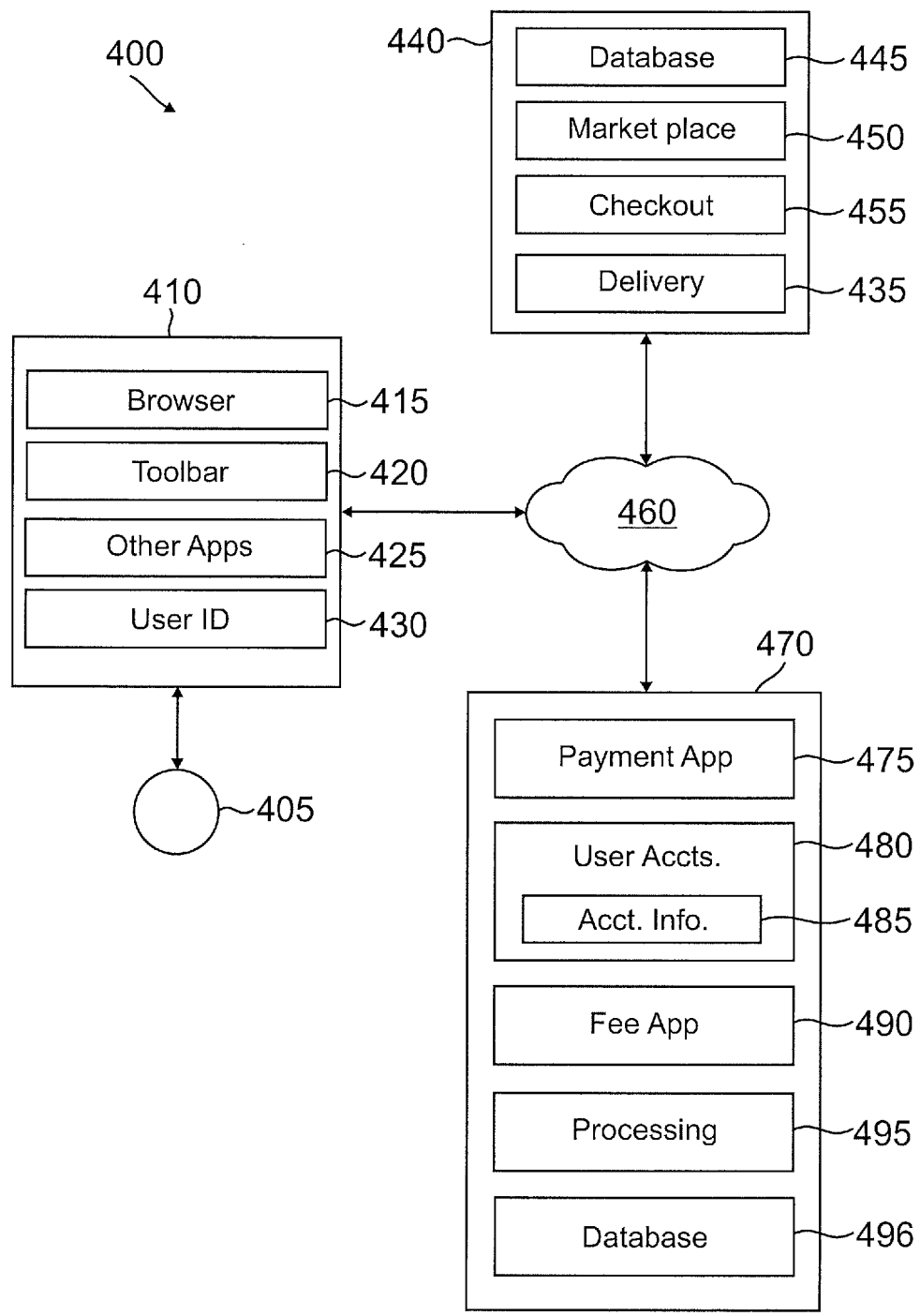
FIG. 4 is a block diagram of a networked system used in a split fee transaction according to an embodiment of the invention.

FIG. 4 is a block diagram of a networked system 400 used in an on-line payment transaction, such as described above, according to an embodiment of the invention. System 400 includes a client device 410, a merchant server 440, and a payment service provider server 470 in communication over a network 460. Payment service provider server 470 may be maintained by a payment provider, such as PayPal, Inc. of San Jose, Calif.

Client device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable medium such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

Client device 410 may be implemented using any appropriate combination of hardware and/or software configured for wired and/or wireless communication over network 460. For example, in one embodiment, client device 410 may be implemented as a personal computer of a user 405 in communication with the Internet. In other embodiments, client device 410 may be a smart phone, personal digital assistant (PDA), laptop computer, and/or other types of computing devices.

As shown, client device 410 may include one or more browser applications 415 which may be used, for example, to provide a convenient interface to permit user 405 to browse information available over network 460. For example, in one embodiment, browser application 415 may be implemented as a web browser configured to view information available over the Internet.

Client device 410 may also include one or more toolbar applications 420 which may be used, for example, to provide client-side processing for performing desired tasks in response to operations selected by user 405. In one embodiment, toolbar application 420 may display a user interface in connection with browser application 415.

Client device 410 may further include other applications 425 as may be desired in particular embodiments to provide desired features to client device 410. In particular, applications 425 may include a payment application and quick pay button, such as described herein for quick payments through a payment provider. Applications 425 may also include security applications for implementing client-side security features, programmatic client applications for interfacing with appropriate application programming interfaces (APIs) over network 460, or other types of applications. Email and/or text applications may also be included, which allow user 405 to send and receive emails and/or text messages through network 460. Client device 410 includes one or more user and/or device identifiers 430 which may be implemented, for example, as operating system registry entries, cookies associated with browser application 415, identifiers associated with hardware of client device 410, or other appropriate identifiers, such as a phone number. In one embodiment, user identifier 430 may be used by a payment service provider to associate user 405 with a particular account maintained by the payment service provider as further described herein.

Merchant server 440 may be maintained, for example, by an on-line merchant, digital goods seller, or application developer offering various products and/or services in exchange for payment to be received over network 460, including digital goods and applications. Merchant server 440 may include a database 445 identifying available products and/or services (e.g., collectively referred to as items) which may be made available for viewing and purchase by user 405. Accordingly, merchant server 440 also includes a marketplace application 450 which may be configured to provide information over network 460 to browser 415 of client device 410. For example, in one embodiment, user 405 may interact with marketplace application 450 through browser applications over network 460 in order to search and view various items identified in database 445.

Merchant server 440 also includes a checkout application 455 which may be configured to facilitate the purchase by user 405 of items identified by marketplace application 450. Checkout application 455 may be configured to accept payment information from user 405 and/or from payment service provider server 470 over network 460.

In one embodiment, merchant server 440 further includes a delivery application 435 which may be configured to deliver a digital or downloadable item to client device 410. For example, if user 405 purchases a downloadable item or enhancement from the merchant, delivery application 435 has the ability to transmit or download the item onto client device 410 or allow additional access to user 405 after payment is confirmed by payment service provider server 470.

Payment service provider server 470 may be maintained, for example, by an online payment service provider which may provide payment on behalf of user 405 to the operator of merchant server 440. Payment service provider server 470 includes one or more payment applications 475 which may be configured to interact with client device 410 and/or merchant server 440 over network 460 to facilitate the purchase of items by user 405 of client device 410 from a merchant operating server 440.

Payment service provider server 470 also maintains a plurality of user accounts 480, each of which may include account information 485 associated with individual users. For example, in one embodiment, account information 485 may include private financial information of users of devices such as account numbers, passwords, credit card information, bank information, or other financial information which may be used to facilitate online transactions by user 405, as well as device information from a phone or PC that aids in determining whether a payment request is to be approved. Payment application 475 may be configured to interact with merchant server 440 on behalf of user 405 during a transaction with checkout application 455 and delivery application 435 to track and manage purchases made by users.

Payment service provider server 470 also includes a fee application 490 which may be configured to process information associated with determining and allocating one or more transaction fees for a transaction. A payment processing application 495 may be configured to receive payment request information via client device 410 including transaction information, merchant information, funding information, and/or user information, process the payment request, and store/retrieve information as needed in a database 496. Fee application 490, processing application 495 and/or database 496 may all or part of payment application 475.

Figure 5:
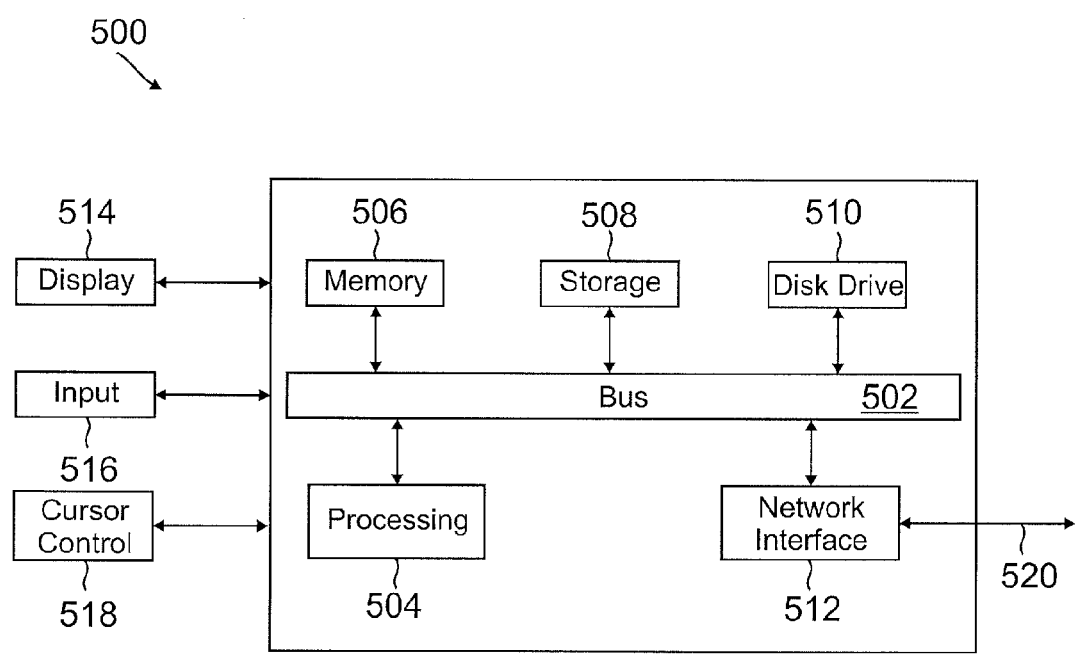
FIG. 5 is a block diagram of a computer system suitable for implementing one or more embodiments of the present disclosure.

FIG. 5 is a block diagram of a computer system 500 suitable for implementing one or more embodiments of the present disclosure. In various implementations, the user device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 500, such as a personal computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 516 (e.g., keyboard, keypad, or virtual keyboard), and a cursor control component 518 (e.g., mouse, pointer, or trackball). In one implementation, disk drive component 510 may comprise a database having one or more disk drive components.

In accordance with embodiments of the present disclosure, computer system 500 performs specific operations by processor 504 executing one or more sequences of instructions contained in system memory component 506, such as described above with respect to the consumer, merchant, and/or payment provider in FIGS. 1-3. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by a communication link 520 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 520 and a communication interface 512. Network interface component 512 may include an antenna, either separate or integrated, to enable transmission and reception via communication link 520. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:

executing, by a mobile device, a mobile device application to access an online merchant marketplace for sale of digital items to a first party from a merchant server, wherein the first party selects a first digital item from the digital items on the online merchant marketplace for purchase in an electronic transaction with a second party;

communicating an identifier for the first party and transaction information for the electronic transaction to a payment provider server processing the electronic transaction, the identifier comprising data identifying a status of the first party as a participant in the electronic transaction, the identifier causing automatic determination of a transaction fee by the payment provider server for the electronic transaction between the first party and the second party to be split based on the status of the first party, a risk associated with the electronic transaction, and sale of the first digital item;

providing, through the mobile device application, a checkout interface displayed on the mobile device comprising at least one negotiation message through a messaging protocol for acceptance of the split amount for the transaction fee;

receiving input from the first party through the mobile device application comprising a modification of the split amount for the transaction fee;

communicating the input to the payment provider server;

in response to receiving a user confirmation of the electronic transaction and the modified split amount in the mobile device application, causing the electronic transaction to be processed using the modified split amount; and executing one or more Application Programming Interface (API) calls over a network to a delivery application of the merchant server to download the digital content from the second party to the mobile device after processing of the electronic transaction using the modified split amount.

2. The method of claim 1, wherein the mobile device application comprises a browser application configured to access a website provided by the payment provider server.

3. The method of claim 1, wherein the mobile device application comprises a dedicated application associated with the payment provider server, and wherein a database of the mobile device stores the credential data for future entry when accessing the user account through the dedicated application.

4. The method of claim 1, wherein prior to the causing the electronic transaction to be processed, the method further comprises:
receiving a renegotiation request for the split amount, wherein the renegotiation request comprises a new proposal for the split amount; and
displaying the renegotiating request to the user in a graphical interface of the mobile device application.

5. The method of claim 1, wherein the transaction fee and the split amount depend on the electronic transaction.

6. The method of claim 1, wherein the transaction fee and the split amount depend on a funding instrument used by the first party to pay for the electronic transaction.

7. The method of claim 1, further comprising:
in response to the payment provider server receiving from at least one party a disagreement on the split amount, receiving a cancelation request of the electronic transaction through a graphical interface of the mobile device application.

8. The method of claim 1, wherein the first party initiates the electronic transaction with the second party on the online merchant marketplace, and wherein the payment provider server generates the electronic transaction between the first party and the second party through the online merchant marketplace.

9. A system, comprising:
a non-transitory memory; and
one or more hardware processors coupled to the non-transitory memory and configured to read instructions from the non-transitory memory to cause the system to perform operations comprising:
executing, by a mobile device, a mobile device application to access an online merchant marketplace for sale of digital items to a first party from a merchant server, wherein the first party selects a first digital item from the digital items on the online merchant marketplace for purchase in an electronic transaction with a second party;
communicating an identifier for the first party and transaction information for the electronic transaction to a payment provider server processing the electronic transaction, the identifier comprising data identifying a status of the first party as a participant in the electronic transaction, the identifier causing automatic determination of a transaction fee by the payment provider server for the electronic transaction between the first party and the second party to be split based on the status of the first party and a risk associated with the electronic transaction and sale of the first digital item;
providing, through the mobile device application, a checkout interface displayed on the mobile device comprising at least one negotiation message through a messaging protocol for acceptance of the split amount for the transaction fee;
receiving input from the first party through the mobile device application comprising a modification of the split amount for the transaction fee;
communicating the input to the payment provider server;
in response to receiving a user confirmation of the electronic transaction and the modified split amount in the mobile device application, causing the electronic transaction to be processed using the modified split amount; and
executing one or more Application Programming Interface (API) calls over a network to a delivery application of the merchant server to download the digital content from the second party to the mobile device after processing of the electronic transaction using the modified split amount.

10. The system of claim 9, wherein the mobile device application comprises a browser application configured to access a website provided by the payment provider server.

11. The system of claim 9, wherein the mobile device application comprises a dedicated application associated with the payment provider server, and wherein a database of the mobile device stores the credential data for future entry when accessing the user account through the dedicated application.

12. The system of claim 9, wherein prior to the causing the electronic transaction to be processed, the operations further comprise:
receiving a renegotiation request for the split amount, wherein the renegotiation request comprises a new proposal for the split amount; and
displaying the renegotiating request to the user in a graphical interface of the mobile device application.

13. The system of claim 9, wherein the transaction fee and the split amount depend on the electronic transaction.

14. The system of claim 9, wherein the transaction fee and the split amount depend on a funding instrument used by the first party to pay for the electronic transaction.

15. The system of claim 9, wherein the operations further comprise:
in response to the payment provider server receiving from at least one party a disagreement on the split amount, receiving a cancelation request of the electronic transaction through a graphical interface of the mobile device application.

16. The system of claim 9, wherein the first party initiates the electronic transaction with the second party on the online merchant marketplace, and wherein the payment provider server generates the electronic transaction between the first party and the second party through the online merchant marketplace.

17. A non-transitory machine-readable medium having stored thereon machine-readable instructions executable to cause a machine to perform operations comprising:
executing, by a mobile device, a mobile device application to access an online merchant marketplace for sale of digital items to a first party from a merchant server, wherein the first party selects a first digital item from the digital items on the online merchant marketplace for purchase in an electronic transaction with a second party;
communicating an identifier for the first party and transaction information for the electronic transaction to a payment provider server processing the electronic transaction, the identifier comprising data identifying a status of the first party as a participant in the electronic transaction, the identifier causing automatic determination of a transaction fee by the payment provider server for the electronic transaction between the first party and the second party to be split based on the status of the first party and a risk associated with the electronic transaction and sale of the first digital item;

providing, through the mobile device application, a checkout interface displayed on the mobile device comprising at least one negotiation message through a messaging protocol for acceptance of the split amount for the transaction fee;

receiving input from the first party through the mobile device application comprising a modification of the split amount for the transaction fee;

communicating the input to the payment provider server;

in response to the user confirmation of the electronic transaction and the modified split amount in the mobile device application, causing the electronic transaction to be processed using the modified split amount; and executing one or more Application Programming Interface (API) calls over a network to a delivery application of the merchant server to download the digital content from the second party to the mobile device after processing of the electronic transaction using the modified split amount.

18. The non-transitory machine-readable medium of claim 17, wherein prior to the causing the electronic transaction to be processed, the operations further comprise:

receiving a renegotiation request for the split amount, wherein the renegotiation request comprises a new proposal for the split amount; and displaying the renegotiating request to the user in a graphical interface of the mobile device application.

* * * * *